Figure 3:
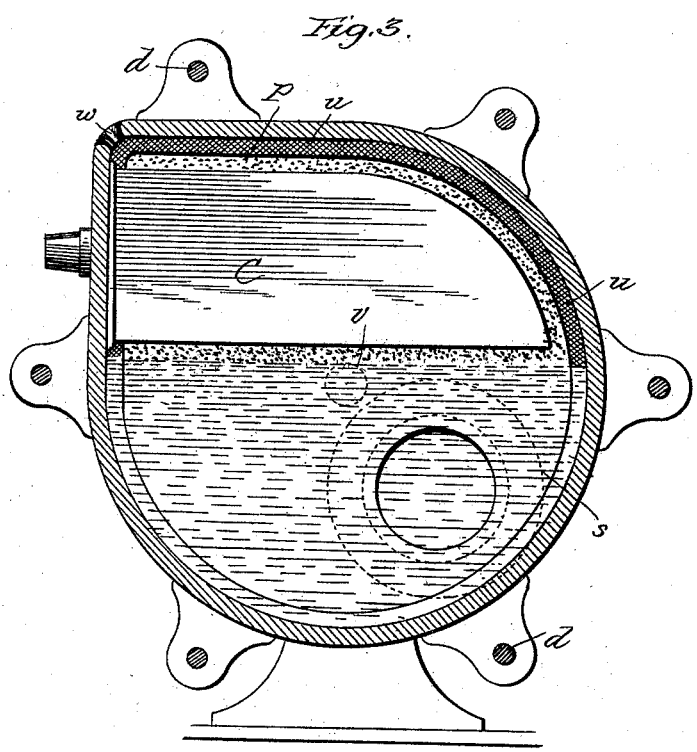

(No Model.) 2 Sheets—Sheet 1.
C. F. HEINRICHS.
ELECTRIC BATTERY.
No. 396,871. Patented Jan. 29, 1889.
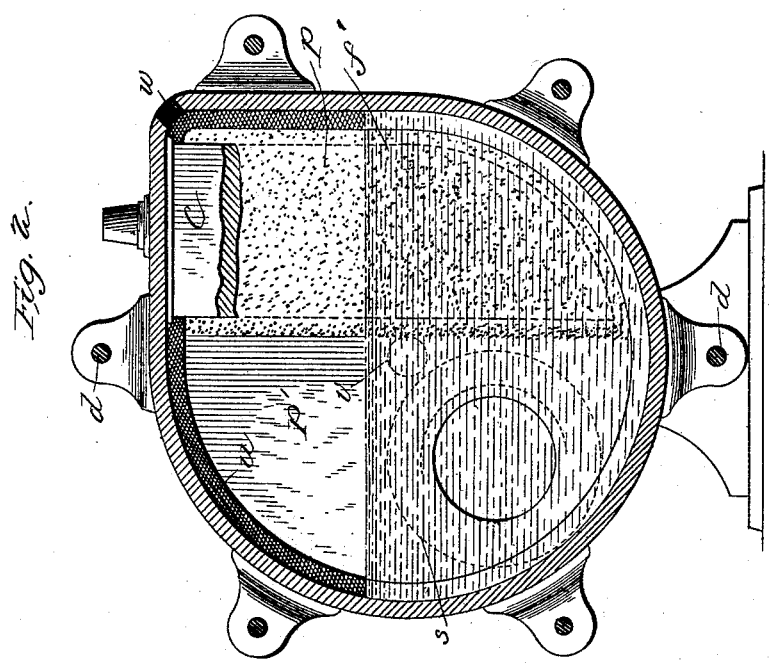
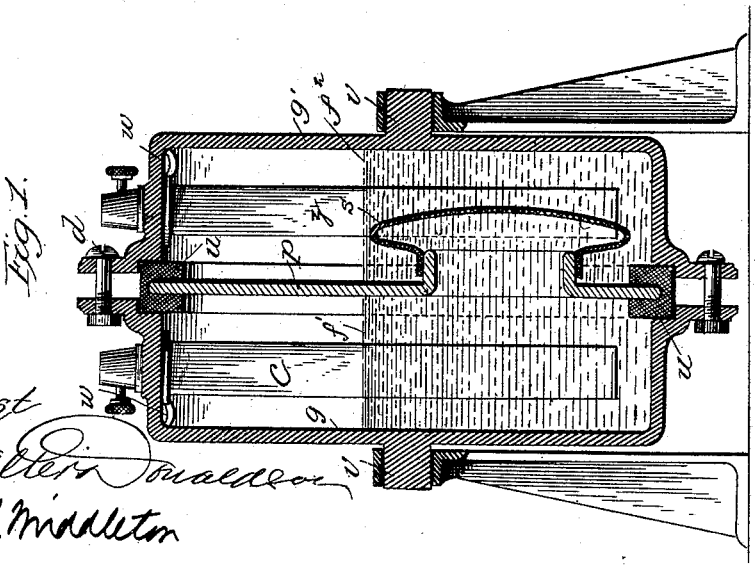
Attest
Walter Donaldson
F. L. Middleton
Inventor
Chas. F. Heinrichs
by Ellis Spear
Atty.

(No Model.) 2 Sheets—Sheet 2.

C. F. HEINRICHS.
ELECTRIC BATTERY.

No. 396,871. Patented Jan. 29, 1889.

UNITED STATES PATENT OFFICE.

CHARLES F. HEINRICHS, OF NEW YORK, N. Y., ASSIGNOR OF ONE-HALF TO WILLIAM F. WIDMAYER, OF SAME PLACE.

ELECTRIC BATTERY.

SPECIFICATION forming part of Letters Patent No. 396,871, dated January 29, 1889.

Application filed April 14, 1888. Serial No. 270,626. (No model.)

*To all whom it may concern:*

Be it known that I, CHARLES F. HEINRICHS, of New York, in the county of New York and State of New York, have invented a new and useful Improvement in Electric Batteries; and I do hereby declare that the following is a full, clear, and exact description of the same.

My invention relates to so-called "tip-batteries." In batteries of this kind two electrodes and one fluid have only been employed, and the electrodes are withdrawn from the one fluid by merely tipping or turning the battery from the position in use into another position, when the electrodes do not further dip in the fluid.

The present invention has for its object the employment of two fluids and a porous diaphragm arranged in such a manner that the two fluids are separated from each other and the porous part of the diaphragm when the battery is tipped and out of use.

A further object is the maintenance of a common level between the several fluids when the battery is in use.

The invention is illustrated in the accompanying drawings, in which—

Figure 1 represents a transverse section of the battery, taken through the supporting-trunnions. Fig. 2 is a similar section taken at right angles to the first, both these figures showing the battery in working position. Fig. 3 is a section similar to Fig. 2, but showing the battery in a position out of action.

The figures show a receptacle composed of two glass shells or cell-inclosures, $g$ and $g'$, provided with trunnions $v$, and flanges by which they are connected to each other. They are rabbeted at their meeting surfaces to receive a grooved rubber ring, $u$, which is clamped between them when they are bolted together. The groove in this ring fits upon a partition-plate, $p$, and all these parts are held in place by the screws $d$. This forms a double cell, of which one cell contains the zinc $z$ and the fluid $f^2$, while the other contains the carbon C and the fluid $f'$. One half of the partition-plate $p$, or a little less than one half, is made porous, as shown in dotted lines, and the other and larger part (marked $p'$) is made non-porous. The plate is arranged in the cell so that the porous part stands between the electrodes and acts as a porous diaphragm when the battery is tipped in the position for use, as in Figs. 1 and 2. When, however, the battery is tipped in the other direction, as shown in Fig. 3, the porous part of the partition is on the upper side and the non-porous part is down and the two fluids are entirely separated, and the electrodes are also out of the liquids.

For the purpose of maintaining an equal level between the two fluids in the battery when it is in position for work, I connect with the partition $p$ an extensible compartment, which is located in one of the divisions of the battery and is in communication with the other. The form in which I have embodied this invention is shown in the figures. The porous part of the wall $p$ has a cylindrical flange around an opening in the wall. Upon this flange is connected the mouth of a non-porous flexible or extensible pouch, $s$, so that the liquid $f'$ in one compartment can pass through the wall into the other compartment containing the liquid $f^2$, but is excluded from mixing with that liquid by the non-porous pouch in which it is contained. This pouch is extended by the pressure of the liquid therein; but its amount is limited by the hydrostatic pressure of the liquid $f^2$, so that the liquid in both compartments will be maintained at the same level.

I do not limit myself to the precise form of the extensible pouch, the essential feature of this part of the invention being a compartment supplementary to the two main compartments connected to one and adapted to receive the liquid therefrom and equal the level in both. The compartments of the battery have holes at $w$ for the introduction of the fluids, and the trunnions $v$ $v$ turn in suitable standards, as shown.

It will be apparent that a plurality of compartments and fluids with suitable electrodes in any number may be made on the same principle.

I do not herein claim, broadly, the supplemental or an expansible pouch or compartment, as that is claimed in a pending application filed April 14, 1888, Serial No. 270,625.

I claim as my invention—

1. In a tipping battery, and in combination, a partition partly porous and partly non-porous, the electrodes arranged in the described relation thereto, and a supplemental chamber connected to an opening in the non-porous part of the partition, all substantially as described.

2. In a tipping battery having a partition, $p$, partly porous and partly non-porous, an opening in the non-porous part with an extensible non-porous pouch connected therewith, all in the described relation to the electrodes and substantially as set forth.

3. In an electric tip-battery, the combination of the double cell-inclosures, the two fluids with a partition-plate partly porous and partly non-porous, and the flexible packing-ring, all arranged substantially as described.

4. In an electric tip-battery, the combination of the two cell-inclosures $g$ and $g'$, the grooved packing-ring $u$, the partition-plate $p$ being partly porous and partly non-porous, with the fluids $f'$ and $f^2$, and the two electrodes $C$ and $z$, all substantially as described.

5. In an electric tip-battery, a partition-plate being partly porous and partly non-porous, and a supplemental non-porous expansion-chamber connected to an opening in the partition-plate, all substantially as described.

In testimony whereof I have signed my name to this specification in the presence of two subscribing witnesses.

CHARLES F. HEINRICHS.

Witnesses:
ROBERT W. CANDLER,
WILLIAM E. RUDISCHHAUSER.